(12) United States Patent
Turner

(10) Patent No.: US 6,454,290 B1
(45) Date of Patent: Sep. 24, 2002

(54) TRAILER HITCH ALIGNMENT DEVICE

(76) Inventor: Danny L. Turner, 221 Woodland St., New Market, AL (US) 35761

( * ) Notice: Subject to any disclaimer, the term of this patent is extended or adjusted under 35 U.S.C. 154(b) by 16 days.

(21) Appl. No.: 09/697,461

(22) Filed: Oct. 26, 2000

Related U.S. Application Data

(60) Provisional application No. 60/161,535, filed on Oct. 26, 1999.

(51) Int. Cl.$^7$ ................................................. B60D 1/40
(52) U.S. Cl. ..................................... 280/477; 116/28 R
(58) Field of Search .......................... 280/477; 33/264; 116/28 R; 403/109.2, 109.3, 389, 400

(56) References Cited

U.S. PATENT DOCUMENTS

| | | | | |
|---|---|---|---|---|
| 3,818,599 A | * | 6/1974 | Tague | 33/264 |
| 4,192,526 A | * | 3/1980 | Myers | 280/477 |
| 4,385,849 A | * | 5/1983 | Crain | 403/109 |
| 4,547,092 A | * | 10/1985 | Vetter et al. | 403/59 |
| 4,583,481 A | * | 4/1986 | Garrison | 116/28 R |
| 4,595,383 A | * | 6/1986 | Nienhaus | 464/162 |
| 5,017,038 A | * | 5/1991 | Kurosaki | 403/385 |
| 5,035,441 A | * | 7/1991 | Murray | 280/477 |
| 5,113,588 A | * | 5/1992 | Walston | 33/264 |
| 5,433,552 A | * | 7/1995 | Thyu | 403/378 |
| 5,558,352 A | * | 9/1996 | Mills | 280/477 |
| 6,076,847 A | * | 6/2000 | Thornton | 280/477 |

* cited by examiner

*Primary Examiner*—Paul N. Dickson
*Assistant Examiner*—Lee Lum
(74) *Attorney, Agent, or Firm*—Joseph H. Beumer

(57) ABSTRACT

A trailer hitch alignment device has a base block for placement on the coupler of a trailer. The block has a magnet at its bottom for being connected to the coupler and a series of apertures directed at varying angles to receive an upright post inclined at a selected angle. A cross arm extending generally horizontally is connected to the post in a manner such as to allow adjustments in vertical and horizontal directions. The post-to-cross arm connection has pair of block members through which the post and cross arm pass and a spring biasing the members together.

2 Claims, 4 Drawing Sheets

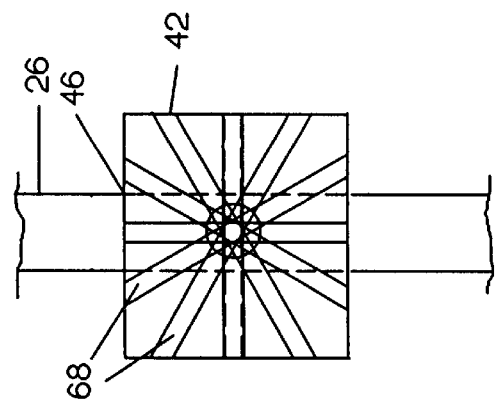
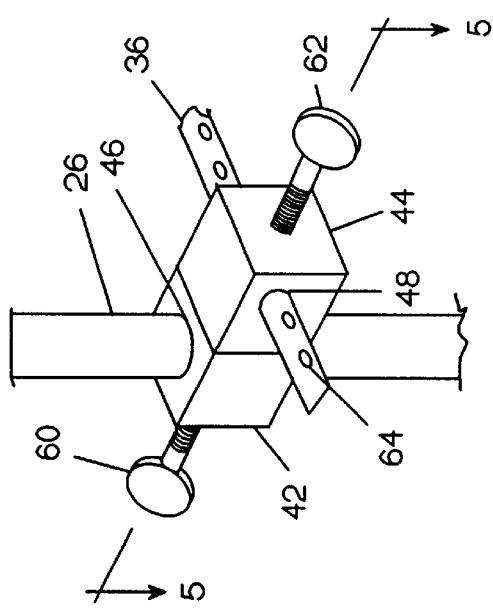
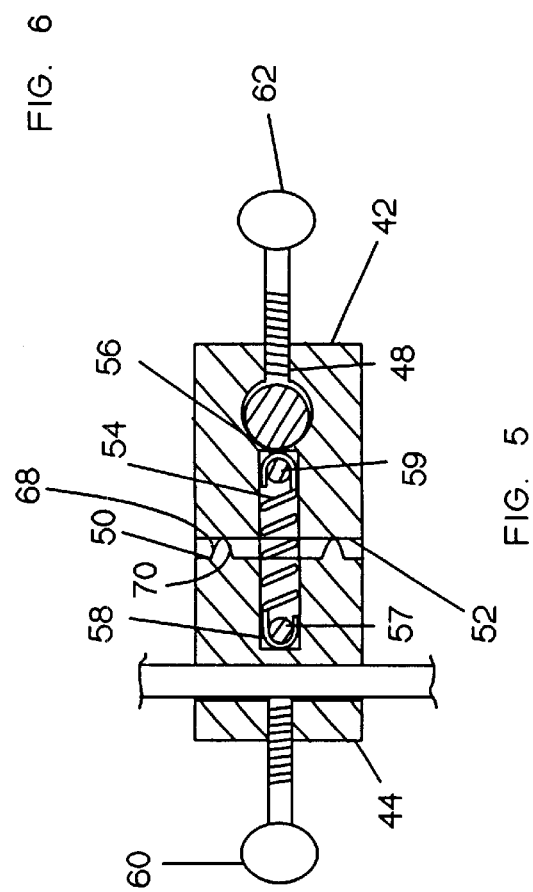

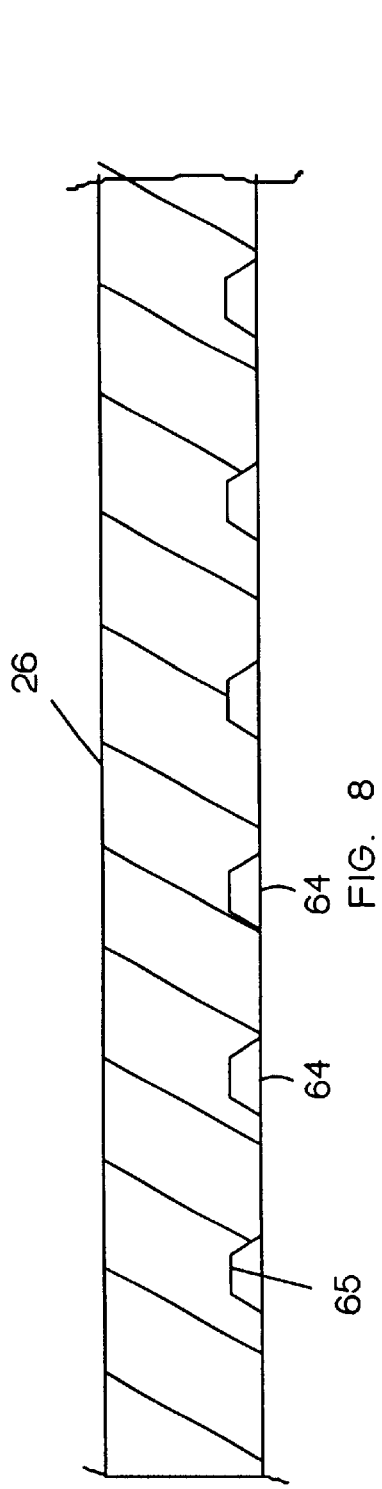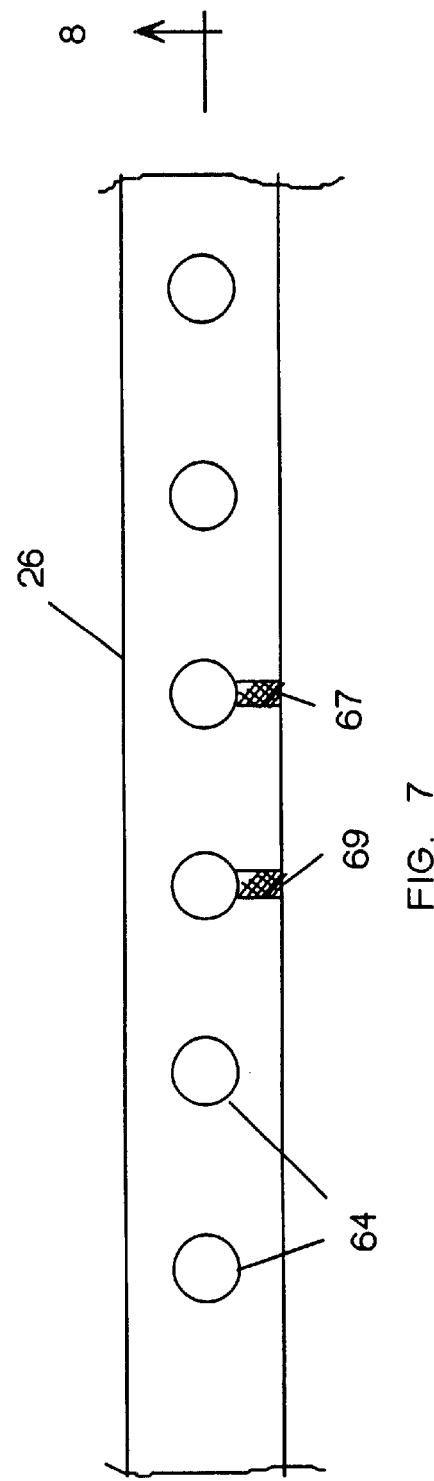

TRAILER HITCH ALIGNMENT DEVICE

CROSS REFERENCE TO RELATED APPLICATION

This application claims the benefit of provisional application Ser. No. 60/161,535, filed Oct. 26, 1999.

FIELD OF THE INVENTION

This invention relates to alignment devices for assisting the driver of a towing vehicle in bringing such vehicle into proper position for connection to a trailer.

BACKGROUND OF THE INVENTION

Alignment of towing vehicles for making connection of a coupler on a trailer with a mating ball carried by the towing vehicle has been a continuing problem. In many instances, one or both of the parts being aligned is obscured from the driver's view so that the driver must blindly estimate the distance moved or rely on off-line devices such as mirrors or indicator flags mounted on flexible poles. In the case of pickup trucks, such indicators are placed to extend upward above the middle of the tailgate. This approach is not effective for certain vehicles such as vans which may have an upwardly extending obstruction in the form of the frame of a rear door or window at the middle of the rear end of the vehicle. In such cases it would be desirable to provide a device with an indicator which could be mounted in a selected angularly inclined position, as well as straight upward.

In addition to flexibility of indicator placement, other desirable features for an alignment device include simplicity of construction and operation as well as ease of assembly and disassembly for storage.

For many applications it would also be beneficial to provide for pre-setting the device in optimum alignment for a particular towing vehicle and trailer and to enable such setting to be reproduced by markings for future use without going through a detailed alignment procedure on each occasion.

Various approaches to trailer alignment devices are shown in prior patents. U.S. Pat. No. 5,036,593, issued Aug. 6, 1991, to Collier, shows an upright post mounted on a magnetic base placed on a trailer coupler, the bottom end of the post movably mounted in a ball and socket joint. The device also has a telescoping horizontal arm extendable to a towing vehicle, U.S. Pat. No. 5,680,706, issued Oct. 28, 1997, to Talcott, shows a vertical post mounted on a coupler and a pivotable horizontal arm.

SUMMARY OF THE INVENTION

The present invention is directed to a trailer hitch alignment device having a base adapted for being removeably mounted on a coupler of a trailer, the base including a block provided with apertures for receiving an inserted pole at a selected one of a plurality of apertures, including a vertically aligned aperture and a plurality of angularly inclined aperatures, enabling a pole to be placed upright or inclined so as to avoid any obstructions to visibility of the pole in upright position. The block has at the bottom portion thereof a magnet for releaseably holding the block in place on the coupler.

The upright pole has a bottom end adapted for insertion into an aperture of the block and is moveably connected to a generally horizontal side arm. At the area of interaction of the post and side arm each of them is passed through one of a pair of support members, and the support members are yieldably secured together by means such as a spring. Adjustments to the location of the post and side arm may be made by sliding the post through the support member to a selected position and securing it with a thumbscrew. Vertical adjustments to the post are normally made to place the intersecting blocks at or near the level of the top of the tailgate for pickup trucks, and horizontal adjustments are made to have the forward end of the side arm come into contact with or in close proximity to the rearward edge of the tailgate.

The device as explained above is preferably employed in combination with sighting enhancement features placed on the towing vehicle, in particular an indicator strip at the middle of the top of the tailgate for a pickup truck and a targeting decal placed on the rear window of other towing vehicles which have an obstruction to sighting directly over the middle of a rear window. Alignment of these components with the forward end of the cross arm, and with the cross arm in contact with or close to a sight indicator on the towing vehicle, ensures that the moving parts are in position for coupling. For off-center alignment where the pole is disposed at an angle to provide visibility around an obstruction, allowance for the distance involved may be made by the driver. The device of this invention also provides for pre-setting of locations of the various components for a specific combination of towing and towed vehicles and for visibly marking the setting for future use with that combination.

It is therefore, an object of this invention to provide a trailer hitch alignment device adapted for use for towing vehicles having partially obstructed view to the rear.

Another object is to provide a device having adjustable components which may be pre-set for specific vehicles and marked in such setting for future use.

Yet another object is to provide an alignment device that may be readily installed and removed without use of tools.

Other objects and advantages of the invention will be apparent from the following detailed description and the claims appended hereto.

BRIEF DESCRIPTION OF THE DRAWINGS

FIG. 4 is a perspective view of a pair of connected support members for receiving an upright post and a horizontal arm, FIG. 5 is a sectional view taken along line 5—5 of FIG. 4, FIG. 6 is an inner end view showing an adjustable locking surface of a support member body, FIG. 7 is a view of an upright post showing circular depressions for receiving a set screw, FIG. 8 is a sectional view taken along line 8—8 of FIG. 7.

DESCRIPTION OF THE PREFERRED EMBODIMENT

Figure 1:
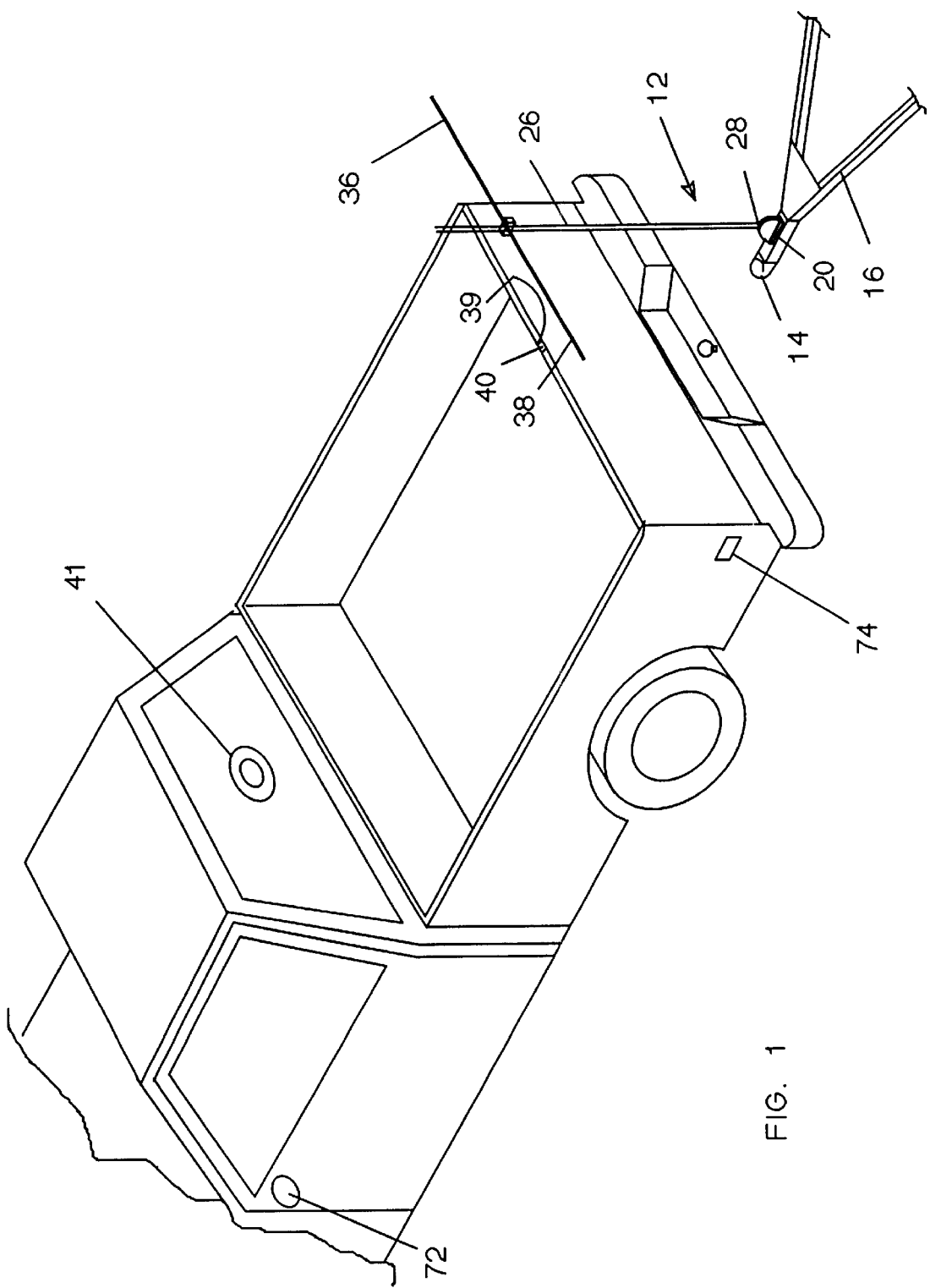
FIG. 1 is a perspective view of an alignment device arranged for engagement of a trailer coupler with a mating ball on a pickup truck.
Figure 2:
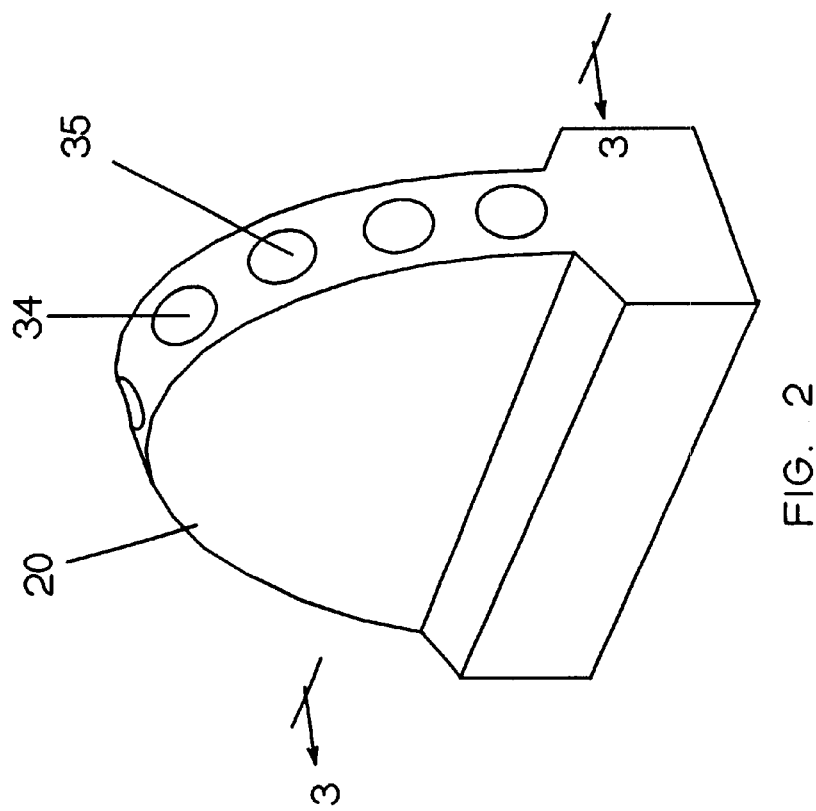
FIG. 2 is a perspective view of a base member of an alignment device.
Figure 3:
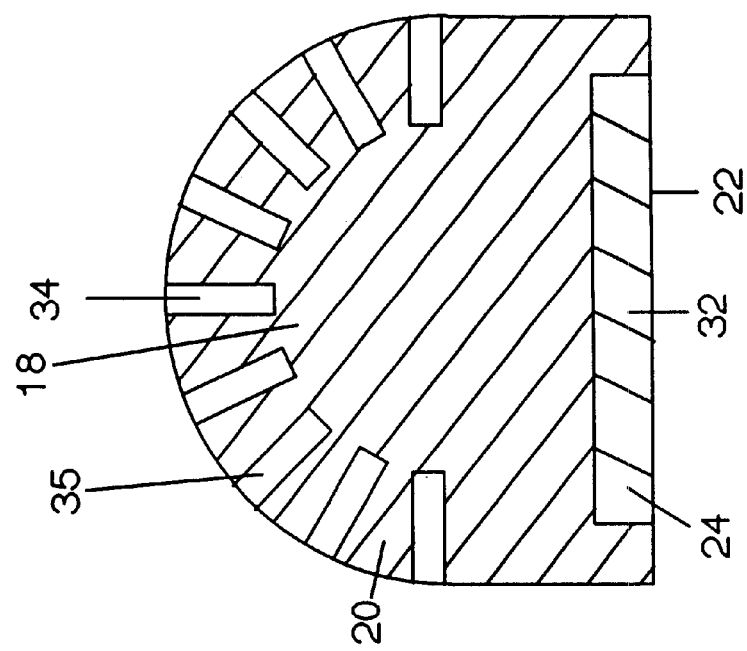
FIG. 3 is a sectional view taken through line 3—3 of FIG. 2.

Referring to FIG. 1 of the drawings, there is shown an alignment device 12, mounted on top of a coupler 14 disposed at the front end of trailer 16. The alignment device has a base member in the form of a generally semicircular block 20 (FIG. 2) of substantial thickness and having a flat bottom 22 in which a magnet 24 is embedded, the magnet providing removeable attachment of the device to the coupler.

A post 26 is removably secured to the block 20 by having its lower end 28 inserted in a selected one of a plurality of apertures 34 35 extending radially outward from a center point 32 at the bottom of block 20. For use where the view of a center portion of the area of the rear end of the towing vehicle is unobstructed, the post would be inserted in aperture 34, which extends straight upward. A selected one of the inclined apertures may be used when necessary to provide an open line of sight away from an obstruction in a central location.

Upright post 26 and cross arm 36 are adjustably secured together in a manner such as to locate the forward end 38 of the cross arm in a position for it to come into close proximity to the back end 39 of indicator strip 40. To provide for difference in distances and heights for different trailers and towing vehicles both vertical and horizontal positioning of the cross arm on the post are made adjustable. A target decal 41 may be provided in the rear window of the truck to further assist in alignment where an obstruction to direct sighting exists.

Post 26 and cross arm 36 are adjustably connected to one another by a pair of support members 42, 44, (FIG. 4) each having a cubic body with an opening 46, 48, extending therethrough for receiving those respective parts. The support members have mating surfaces 50, 52, biased together by a spring 54, having ends 56, 58 embedded in the support members and secured by pins 57, 59.

Each of the support members has a thumbscrew 60, 62 communicating with an opening 46, 48 therein for securing the parts in a selected position.

The post and cross arm each have spaced apart circular indentations 64 extending into the circumference thereof as shown in FIG. 7 and FIG. 8, the indentations having flat bottom surfaces 65 adapted to receive the inner ends of the thumb screws at a selected position. Indicator means such as different colored paint stripes 67, 69 for different notches may be used to facilitate setting of these parts to the same position for future use on the same vehicle. The notches provide a range of preselected positions for a variety of vehicles, and may extend along the entire length of the post and cross arm.

The post and cross arm may both include means for telescoping or folding the device for storage.

Serrations or mating ridges 70 and groove 68 may be provided at contacting surfaces 50, 52 of the support members to maintain the assembly in position once it is aligned.

Flags or other highly visible indicators such as brightly colored tape or strips of material provided with fluorescent or "glow-in-the-dark" coating may be used to enhance visibility, especially under poor lighting conditions.

The post may be deployed in a horizontal position by being inserted in the lowest aperture of support block 20 for situations where direct vision to the trailer is blocked. In this embodiment sighting would be enabled by a side mirror 72 on the towing vehicle and an indicator strip 74 located near the rear extremity of the vehicle side.

Although other materials may be used, it is preferred to use molded plastic for the base support block and blocks in which the post and cross arm are deployed. Conventional fabrication techniques may be used in manufacturing these components. The post and cross arm may also be comprised of plastic. The vertical post preferably would have a diameter of one-half inch, while the cross arm may be half that size, that is one-fourth inch in diameter.

Continuing use of the invention for aligning the same towing vehicle with the same towed trailer may be facilitated by establishing optimum locations for a selected aperture in which the post is inserted and for positioning of the post and cross arm in their support members at specific angles and distances along their lengths. These locations would then be identified by markers such as a piece of visible tape or a painted indicator strip. After the device is taken apart for storage, correct locations for re-assembly could then be easily ascertained. When disassembled, the device of this invention occupies a small space and can be placed under or behind a seat of a pickup truck or in a car trunk.

Although the invention is described above in terms of specific embodiments, it is not to be understood as so limited, but is limited only as indicated by the appended claims.

What is claimed is:

1. An alignment guide for a towed trailer having a ball-engaging magnetic-metal coupler at a forward end thereof with a ball carried at a rear location of a towing vehicle, said coupler having an inverted, forwardly extending socket at said end and an upper surface behind the socket, said guide comprising:

a block adapted for placement on said upper surface of said coupler, said block including in a lower portion thereof a magnet removably securing said block to said coupler;

said block including an upper portion and said upper portion of said block has a generally semicircular cross section and has defined in said upper portion a plurality of outwardly extending receptacles disposed at angles varying from one another, and said receptacles are defined by tubular apertures extending toward a common point at a lower portion of said block, said receptacles being adapted to support an inserted post in a stationary position until said post is removed;

a post having a lower end insertable in a selected one of said receptacles;

a cross arm carried by said post and having an end visible to a driver of said vehicle; and a support member assembly adjustably connecting said post to said cross arm.

2. The alignment guide as defined in claim 1, wherein said receptacles include a first, vertically extending aperture and a plurality of non-vertical apertures deployed at varying angles away from vertical.

\* \* \* \* \*